W. Bullock,
Grain Drill,
No 6,996.    Patented Jan. 8, 1850.
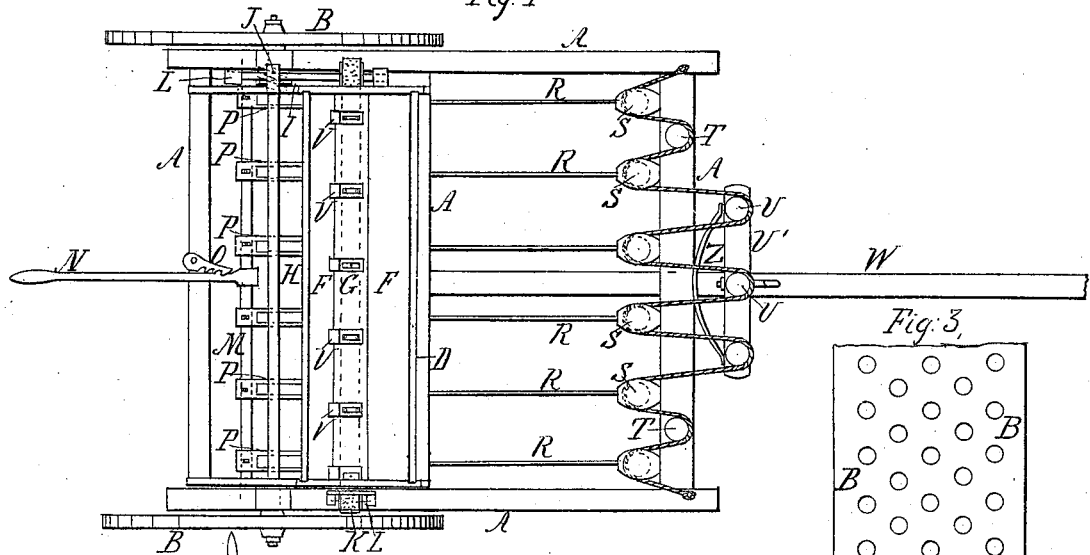
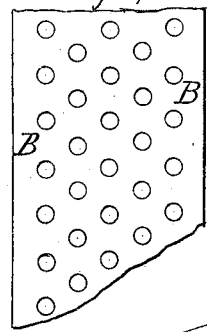
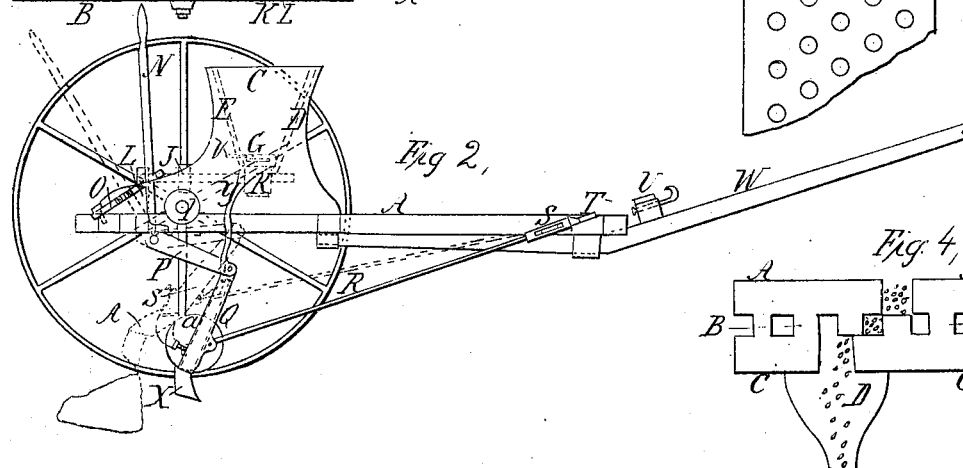
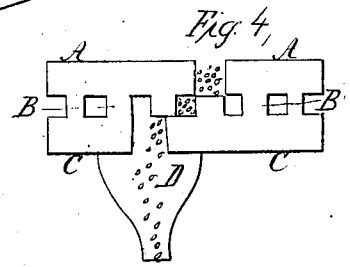

UNITED STATES PATENT OFFICE.

WILLIAM BULLOCK, OF PHILADELPHIA, PENNSYLVANIA.

IMPROVEMENT IN GRAIN-DRILLS.

Specification forming part of Letters Patent No. 6,996, dated January 8, 1850; antedated October 29, 1849.

*To all whom it may concern:*

Be it known that I, WM. BULLOCK, of the city and county of Philadelphia, and State of Pennsylvania, have invented a new and useful Improvement in Grain Drills and Cultivators; and I hereby declare that the following is a full and exact description thereof.

The nature of my invention consists in its self-regulating principles, by which it clears the teeth from straw and other fibrous substances, and by which each tooth is made to rise and fall with the surface of the ground, and by which principles, the simple action of the team in hauling the drill will allow any of the teeth to pass over any permanent obstructions which may be concealed under the ground and bring the said teeth to their proper places immediately on their passing the said obstructions.

To enable others skilled in the art to make and use my invention, I will proceed to describe its construction and operation.

In the accompanying drawings, which form a part of this specification, Figure 1 represents a top view; Fig. 2, a side elevation; Fig. 3, a section of the feeding-band; Fig. 4, sections of the bottom of the hopper, a section of the feeding-band and conductor.

In Figs. 1 and 2 like letters represent like parts.

A is a frame five and one-half feet broad and five feet long; B, wheels three and one-half feet in diameter, one of which is keyed to the shaft; C, ends of the hopper; D, front; E, back; F, interior; G, movable bottom; H, main shaft; I, screw on main shaft, four inches in diameter, the thread of which screw runs two inches in going once around; K, pulleys, four inch face, four inches diameter, one of which pulleys is on the same shaft as wheel J, and the other, K', is at the opposite end of the hopper. The feeding-band passes over these pulleys, the upper part of the band passing between the movable and permanent bottoms of the hopper in the direction indicated by a dart, Fig. 4. As the holes in the band pass the slots in the movable bottom they are filled with grain, and discharge the same through the slots in the permanent bottom and through conductors Y, Fig. 2, and D, Fig. 4, through the sockets Q and teeth X, falling into the bottom of the furrows, and as the teeth pass the ground falls in and covers the grain.

L is a box to the shaft of J and K, which box passes down inside of the frame, and has a projection over the shaft M; M, rock-shaft, on which the arms P are placed, and to which hand-lever N is fastened, and also having a cam under the projection on L, which cam raises L and throws I and J out of gear, and stops the feed at the same time that the teeth are raised out of the ground; P, arms ten inches long, nine inches apart from center to center, loose on the shaft, have an oblong slot through which studs are screwed into the shaft. The said slots are of sufficient length to allow the end of the arms to which the teeth are attached to vibrate from six to eight inches. O, ratchet, which is hooked over the hand-lever N when the teeth are to be held out of the ground; Q, hollow sockets; a, rollers on the side of the sockets, which rollers run on the surface of the ground; X, hollow teeth passing up inside of the sockets, which teeth are held to their places by means of set-screws in the back of the sockets. The teeth may be set out below the lower side of the rollers a, according to the depth that the grain is to be planted.

R represents rods connecting sockets Q and sheaves S; T, sheaves on frame; U, sheaves on movable bar, to which bar the team is attached; Z, spring; W, pole or tongue; V, slides passing through the back of the hopper, and when pressed in closing the slots in the movable bottom of the hopper. These slides are for the purpose of regulating the feed or stopping it entirely. Dotted lines S show the position of the teeth when raised out of the ground.

A represents a tooth passing over a rock.

To use the above-described drill, put the seed in the hopper, open the slots in the movable bottom, according to the quantity of seed that you desire to sow to the acre. Raise the hand-lever N, which will let the teeth into the ground, and at the same time it will bring I and J into gear, thus moving the feed-band and dropping the grain in the ground, as before described.

By removing the hopper and feeding-gears the above machine will be converted into a self-regulating cultivator, plowing an even depth and passing over obstructions without injuring the machine or stopping the team.

Having thus fully shown the construction and operation of my self-adjusting grain drill and cultivator, what I claim as new and of my invention, and desire to secure by Letters Patent, is—

1. The rollers $a$, which rollers serve to clear the teeth from rubbish and govern the depth of the teeth.

2. The spring Z, in combination with the sheaves and teeth, by which arrangement the whole or a part of the teeth can be held by a spring of the same power and range of movement that it would require for a single tooth.

3. The movable bar U′, to which the team is attached, in combination with the mode of hanging the teeth by means of sheaves or other similar device, by which arrangement the teeth will pass over obstructions in which the action of the team in hauling the drill or cultivator will bring the teeth forward to their proper places as soon as they pass over the obstructions.

4. The feeding-band, substantially in the manner and for the purpose set forth.

WM. BULLOCK.

Witnesses:
I. B. MURPHY,
P. A. FITZGERALD.